Figure 1:
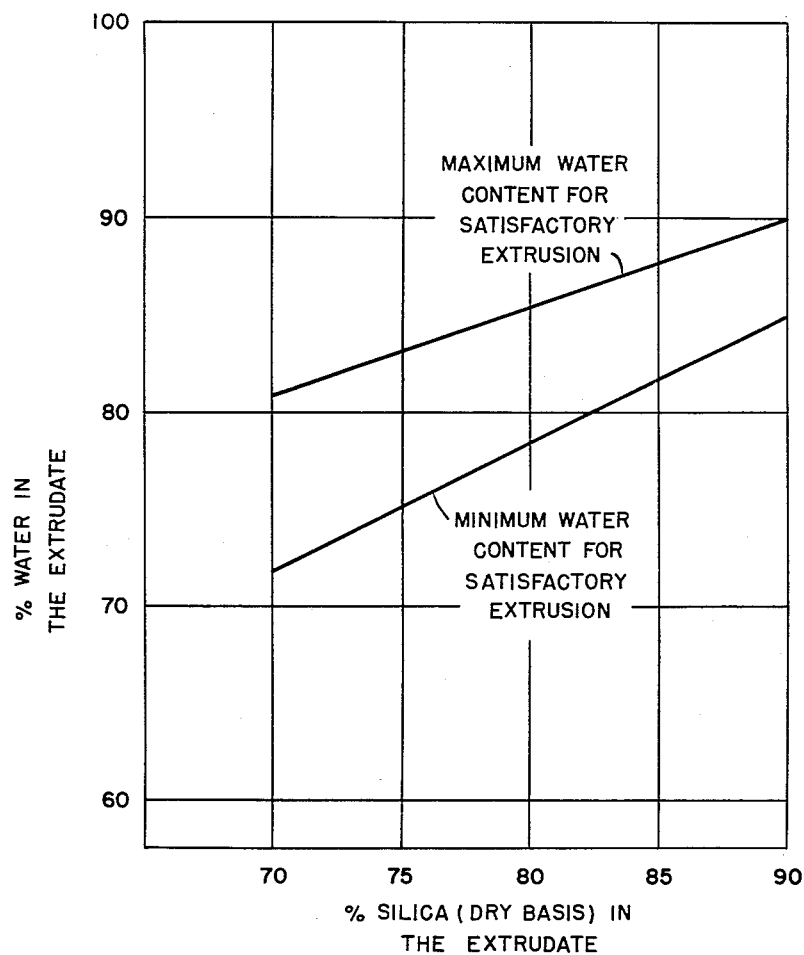

FIG. I

INVENTORS
HILLIS O. FOLKINS
BY KENNETH E. LUCAS
ATTORNEY

United States Patent Office 3,004,929
Patented Oct. 17, 1961

3,004,929
METHOD OF PREPARING A CATALYST SUPPORT
Kenneth E. Lucas and Hillis O. Felkins, Crystal Lake, Ill., assignors to The Pure Oil Company, Chicago, Ill., a corporation of Ohio
Filed Nov. 19, 1958, Ser. No. 775,046
11 Claims. (Cl. 252—442)

This invention comprises a new and improved process for the preparation and extrusion of silica-alumina catalyst supports.

Silica-alumina compositions are well known in the art as adsorbents, catalysts, and catalyst supports for a variety of chemical reactions. In the past, silica-alumina catalysts or catalyst supports have been prepared by various precipitation methods in which silica and alumina are combined to form a silica-alumina hydrogel. The gel is then ion-exchanged, washed, dried, calcined, and formed into the desired physical shape by certain sequential procedures. For fluid catalytic beds, the catalyst may be ground into a powder, but more frequently it is formed into microspheres by spray-drying. In many applications, however, it is necessary to use the silica-alumina support in the form of pills, pellets, or tablets. As a practical matter, it has proved difficult to form satisfactory pellets of desired size without the use of a binding agent which may interfere with the catalytic activity of the support. As a result, there have been numerous procedures proposed for forming silica-alumina hydrogels into pellets for use as catalyst supports. One procedure which has been investigated for the formation of very small pellets has been an extrusion process whereby the silica-alumina is extruded through a small die and the spaghetti-shaped product cut into small pellets. While the need for a satisfactory extrusion process has been recognized by the prior art no satisfactory process has been proposed for extrusion of acidic silica-alumina catalyst supports containing 70–90% silica. Catalyst supports of this composition are very hard and abrasive when dried and have proved extremely difficult to extrude or otherwise form into pellets.

It is therefore one object of this invention to provide an improved process for the extrusion of silica-alumina catalyst supports containing 70–90% silica (dry basis).

Another object of this invention is to provide an improved process for extruding silica-alumina catalyst supports, containing 70–90% silica, in which the extruded material may be cut into small pellets which are coherent and resistant to fracturing or powdering.

A feature of this invention is the provision of an improved process for extrusion of silica-alumina catalyst supports, containing 70–90% silica (dry basis), by maintaining the water content of the support within certain critical limits prior to and during the extrusion.

A further feature of this invention is the provision of an improved process for extrusion of silica-alumina catalyst supports, containing 70–90% silica (dry basis), in which a small amount of a fluorine-containing compound is incorporated in the catalyst support prior to extrusion.

Other objects and features of this invention will become apparent from time to time throughout the specification and claims as hereinafter related.

Figure 2:
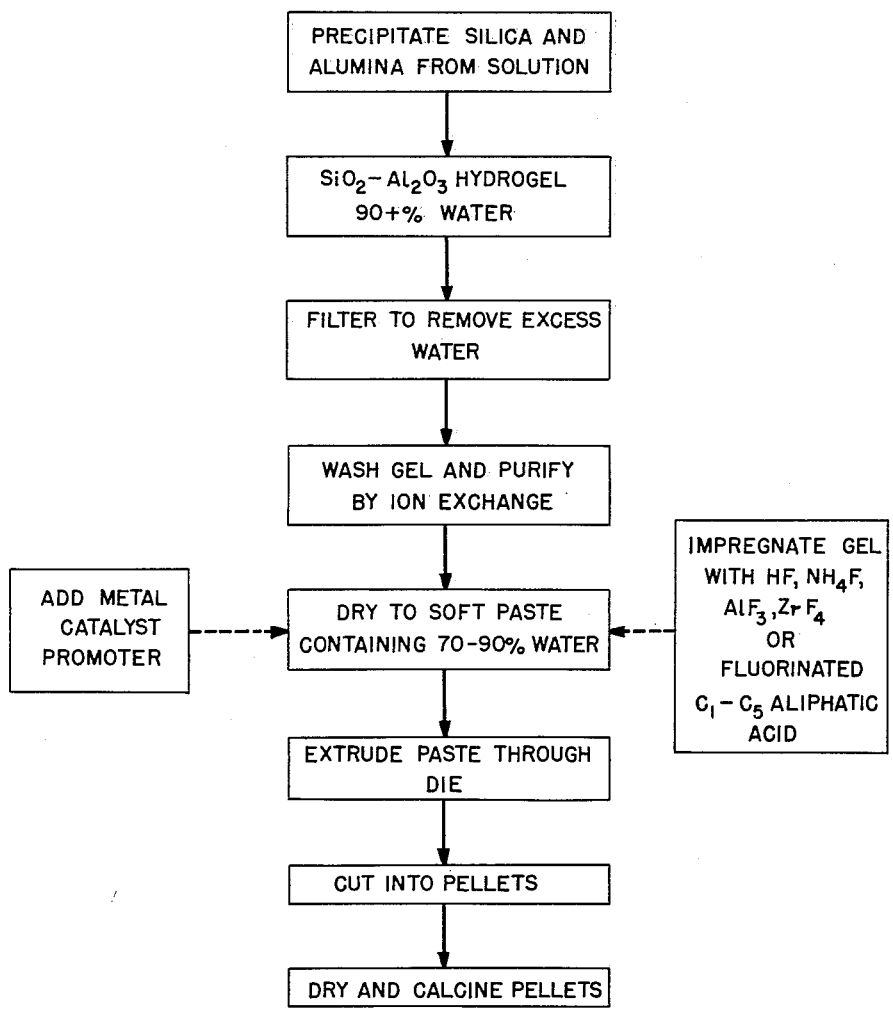

In the accompanying drawings, to be taken as a part of this specification,

FIGURE 1 is a graph showing lines of minimum and maximum water content for silica-alumina compositions, containing 70–90% silica (dry basis), for satisfactory extrusion, and FIGURE 2 is a flow diagram illustrating this process.

This invention is based upon our discovery that high-surface-area silica-alumina, containing 70–90% silica (dry basis), may be extruded and cut into small pellets which are satisfactory for use as catalysts or catalyst supports if the water content of the silica-alumina hydrogel is maintained between the upper and lower lines shown in FIG. 1 of the drawings. It is well known that high-surface-area silica-aluminas, especially those containing 70–90% silica (dry basis), are difficult to form into discrete particles for use as fixed-bed catalyst or catalyst supports because of their high degree of abrasiveness and glasslike porous structure. In the manufacture of fixed-bed cracking catalysts, this difficulty has been overcome by gelling the hydrosol in a column of oil to form spherical beads, or by molding the catalyst after the water content of the gel has been materially reduced. Extrusion or pelleting of the dried gel has proved difficult and costly because of the abrasiveness of the material.

In carrying out this invention, silica and alumina are precipitated as a hydrogel from solution and filtered, purified by ion-exchange, and washed. Various known procedures are employed for the formation of the silica-alumina hydrogel. Thus, the silica and alumina may be coprecipitated by mixing an acidified solution of an aluminum salt with sodium silicate. Alternately, the silica gel may be formed by treatment of a solution of sodium silicate with an acid, followed by the incorporation of alumina therein by the precipitation of an aluminum salt with a base such as ammonia. The water content of the hydrogel required for satisfactory extrusion lies between the upper and lower limits indicated by the lines in the graph which is FIG. 1 of the drawings. In this graph, the percentage of water in the extruded material is expressed as a percentage of the total weight of the composition. It has been found that the use of an amount of water in excess of that shown by the upper line of the graph results in an extrudate which is soft and will not hold its form. The use of an amount of water which is less than that shown by the lower line of the graph results in a composition which extrudes poorly (and requires the use of a high pressure, screw-type extruder) and produces an extrudate which disintegrates upon drying. It has also been found that incorporating a fluorine-containing compound in the extrudate prior to extrusion results in a more cohesive product and permits the extrusion to be effected at lower pressures.

The following non-limiting examples demonstrate the scope of this invention and a preferred method of carrying out the novel process which we have discovered.

*Example I*

A batch of silica-alumina hydrogel, containing 87% silica and 13% alumina (dry weight basis), and having a potential surface area of about 500 square meters per gram, was prepared by the addition of an aqueous solution of sodium silicate to an acidified solution of aluminum sulfate. The hydrogel was filtered, washed, and subjected to ion-exchange, using a hydrogen ion-exchange resin to remove by-product metal ions. After being purified by ion-exchange and washed, the filter cake had a water content of 90%, based on the total weight of the hydrogel. A portion of this filter cake was extruded, using a low-pressure extruder, through a $3/16''$ die and cut into pellets. The extruded material was very soft and deformed readily. The pellets which were produced by cutting the extrudate into short lengths were dried and calcined at 1050° F. The pellets which were thus produced were hard but contained many fracture lines and broke readily into small fragments.

A second portion of the filter cake (silica-alumina hydrogel) was air-dried at 225°–400° F. to a water content of 72%. This material did not extrude satisfactorily using a low-pressure extruder, and it was necessary to use a screw-type, high-pressure extruder. Using a screw-type, high-pressure extruder, the hydrogel tended to abrade the die and produced an extrudate which tended to crumble. When the extrudate was cut into pellets and dried, the pellets powdered and completely disintegrated upon handling.

A third portion of the hydrogel filter cake was air-dried at 225°–400° F. to about 85% water content. This material was extruded through a 3/16" die using a low-pressure extruder. This hydrogel extruded easily and produced an extrudate which was firm and homogeneous. The extrudate was cut into short lengths to form small pellets, and the pellets were dried and calcined as in the other examples. The pellets which were produced, after drying and calcining, were hard and uniform in physical characteristics, containing substantially no fracture lines.

*Example II*

A number of additional experiments were carried out using silica-alumina hydrogels of varying compositions. As a result of these and other experiments, we have found that the water content of the hydrogel which is required for satisfactory extrusion varies according to the silica content of the gel. Thus, hydrogels containing 90% silica require a higher water content for satisfactory extrusion than do gels containing 70% silica. In a number of experiments, we have found that the maximum water content of a silica-alumina hydrogel for satisfactory extrusion corresponds substantially to the upper line of the graph shown in FIG. 1. Likewise, the minimum water content for satisfactory extrusion follows approximately the lower line of the graph shown in FIG. 1. Thus, the satisfactory extrusion of an 87/13 silica-alumina requires a water content of 82–88%, while a 75/25 silica-alumina requires a water content of 75–83%.

*Example III*

The catalysts or catalyst supports which are produced by the extrusion process of this invention may be used as cracking catalysts in fixed- or moving-bed reactors, or as catalysts in other reactions wherein this composition affords appropriate activity and selectivity. More generally, however, these catalyst supports, as formed by the process of this invention, are used in conjunction with certain metals or metal oxides as promoters to form finished particulate catalysts for effecting reactions, such as isomerization, hydrogenation, and reforming of petroleum hydrocarbons. Promoters which may be added to these catalyst supports are preferably group VIII metals, such as platinum, palladium, rhodium, nickel, cobalt, etc., and transition metal oxides of group VI, such as those of chromium, molybdenum and tungsten. The amount of promoter added to make the final catalyst composition varies according to the end use of the catalyst and the nature of the specific promoter added, and varies in the range from about 0.05 to 10% w. of the final catalyst. Generally, the metal oxides are added in the higher concentration range while metals, particularly metals of the platinum group, are added in concentrations of about 1% or less. Catalysts particularly effective for the isomerization of n-paraffins and having good physical characteristics are those in which palladium, platinum, and/or rhodium are added in concentrations of 0.05–1.0% w. to the silica-alumina catalyst support. These metal promoters are preferably added to the hydrogel at a point in the process prior to extrusion. Thus, the metal promoter may be added to the solutions from which the silica and alumina are precipitated, and precipitated at this point. The metal promoter may also be precipitated on a preformed and purified silica-alumina hydrogel, or may be added as a solution of a soluble metal compound to the purified silica-alumina hydrogel, followed by drying of the mass to the desired water level. As a further alternative, the metal promoter may be added by impregnation of the catalyst pellets after extrusion and calcining, followed by reduction or other suitable treatment to convert the metal into the most active catalytic form.

A sample of the hydrogel produced in Example I was treated with an aqueous solution of palladium nitrate, of a concentration sufficient to produce 0.35% w. palladium in the finished catalyst pellets, just prior to the drying step which precedes extrusion. The hydrogel was then dried to 80% water (based on the total weight of the hydrogel) and extruded as in Example I. The catalyst pellets, which were obtained by cutting the extrudate into short lengths, were dried and calcined, and activated by treatment with hydrogen at 975° F. for a period of about 14 hours. These catalyst pellets were highly active when used in the hydroisomerization of n-pentane at 725° F. The addition of other metal promoter salts, e.g., platinum, rhodium, nickel, or cobalt salts, to the hydrogel prior to extrusion does not deleteriously affect the extrudability of the gel under the conditions of this process.

*Example IV*

We have also found that by including certain fluorine-containing compounds, e.g., hydrofluoric acid, ammonium fluoride, aluminum fluoride, zirconium fluoride, and fluorinated $C_1$–$C_5$ aliphatic acid, such as fluoroacetic acid, difluoroacetic acid, trifluoroacetic acid, etc., improves the physical characteristics of the extrudate and makes the extrusion of the hydrogel easier. By adding about 0.1–5.0% (and preferably 0.5–3.0%) any of these fluorine-containing compounds to the extrudate prior to the extrusion step, it is possible to extrude the gel at lower pressures and slightly lower water contents, e.g., 65–85%. Additionally, the extrudate containing these fluorine-containing compounds is more homogeneous and produces stronger pellets.

In one experiment, the filter cake produced in accordance with Example I was treated with 2% aqueous hydrofluoric acid for a period of 30 minutes. The treated gel was then filtered and dried to a water content of 83%. The filter cake containing 83% water extruded more easily than did the gel containing 85% water in Example I.

A silica-alumina hydrogel, produced in accordance with Example I, is treated with a 2% aqueous trifluoroacetic acid and dried to a water content of about 83%. The gel extrudes easier than the gel containing 85% water in Example I.

When a hydrogel prepared in accordance with Example I is treated with hydrofluoric acid, ammonium fluoride, or a fluorinated aliphatic acid, the fluorine-containing compound is added in aqueous solution. When the hydrogel is treated with aluminum fluoride or zirconium fluoride, the fluoride is precipitated in situ in the hydrogel. The fluoride is precipitated by adding an aluminum or zirconium compound in aqueous solution, and treating the same with aqueous ammonium fluoride. This precipitation step may be carried out simultaneously with the original precipitation of silica and alumina from solution, or may be carried out in any of the subsequent steps prior to the drying of the hydrogel in preparation for extrusion. The treatment of the silica-alumina hydrogel with these fluorine-containing compounds apparently provides some form of internal lubrication for the gel which makes it easier to extrude. The addition of these compounds may also be carried out in conjunction with the addition of the metal promoter. Thus, the fluorine-containing compounds may be added prior to addition of the metal promoter or simultaneously therewith.

The process of extrusion which has been described above is limited to the extrusion of silica-alumina hydrogen which has been precipitated from solution and which has never been completely dried. When a silica-alumina hydrogel is dried and pulverized for storage prior to formation into pellets, the powdered material may be extruded but the techniques which are involved are substantially different from those used in this invention and do not constitute a part of this invention.

While we have described our invention fully and completely, as required by the patent laws, with special emphasis upon several preferred embodiments of the invention, we wish it understood that within the scope of the appended claims this invention may be practiced otherwise than as specifically described.

What is claimed is:

1. In a method of preparing a catalyst support by precipitating silica and alumina from solutions of silicon and aluminum salts to produce a hydrogel containing more than 90% w. water and 70–90% silica on a dry-weight basis, filtering the precipitate to remove excess water, subjecting the precipitate to ion-exchange to remove undesired by-products, and washing the precipitate, the improvement which comprises air-drying the washed silica-alumina hydrogel at 225°–400° F. for a time sufficient to convert the hydrogel to a smooth paste containing an amount of water proportional to the amount of silica in the hydrogel in the range between the upper and lower lines in FIG. 1, extruding the paste through a die, cutting the extrudate into small pellets, and drying and calcining the pellets.

2. A method in accordance with claim 1 in which the silica-alumina hydrogel is coprecipitated from a mixed solution of a silicate salt and an aluminum salt.

3. A method in accordance with claim 1 in which the silica is first precipitated from a solution containing a silicate salt, and the silica is impregnated with a soluton of an aluminum salt and alumina precipitated therefrom.

4. A method in accordance with claim 1 in which the silica-alumina hydrogel is impregnated with a metal promoter prior to extrusion.

5. A method in accordance with claim 1 in which the hydrogel contains 75% silica and 25% alumina on a dry-weight basis and contains 75–83% water prior to extrusion.

6. A method in accordance with claim 1 in which the hydrogel contains 87% silica and 13% alumina on a dry-weight basis and contains 82–88% water prior to extrusion.

7. In a method of preparing a catalyst support by precipitating silica and alumina from solutions of silicon and aluminum salts to produce a hydrogel containing more than 90% w. water and 70–90% silica on a dry-weight basis, filtering the precipitate to remove excess water, subjecting the precipitate to ion-exchange to remove undesired by-products, and washing the precipitate, the improvement which comprises impregnating the silica-alumina hydrogel with a compound of the group consisting of hydrogen fluoride, aluminum fluoride, zirconium fluoride, ammonium fluoride, and fluorinated low-molecular-weight aliphatic acids, air-drying the silica-alumina hydrogel at 225°–400° F. for a time sufficient to produce a smooth paste containing 65–85% water, extruding the paste through a die, cutting the extrudate into small pellets, and drying and calcining the pellets.

8. A method in accordance with claim 7 in which the silica-alumina hydrogel is coprecipitated from a mixed solution of a silicate salt and an aluminum salt.

9. A method in accordance with claim 7 in which the silica is first precipitated from a solution of a silicate salt, and the silica is impregnated with a solution of an aluminum salt and alumna precipitated therefrom.

10. A method in accordance with claim 7 in which the silica-alumina hydrogel is impregnated with a metal promoter prior to extrusion.

11. A method in accordance with claim 10 in which the metal promoter is added in solution with the fluorine-containing compound.

References Cited in the file of this patent

UNITED STATES PATENTS

| | | |
|---|---|---|
| 2,280,650 | Kassel | Apr. 21, 1942 |
| 2,409,494 | Keating | Oct. 15, 1946 |
| 2,480,669 | Payne et al. | Aug. 30, 1949 |
| 2,506,923 | Hoekstra | May 9, 1950 |